(12) United States Patent
Liu et al.

(10) Patent No.: US 11,928,434 B2
(45) Date of Patent: Mar. 12, 2024

(54) METHOD FOR TEXT GENERATION, DEVICE AND STORAGE MEDIUM

(71) Applicant: BEIJING BAIDU NETCOM SCIENCE AND TECHNOLOGY CO., LTD., Beijing (CN)

(72) Inventors: Jiachen Liu, Beijing (CN); Xinyan Xiao, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 354 days.

(21) Appl. No.: 17/444,693

(22) Filed: Aug. 9, 2021

(65) Prior Publication Data
US 2021/0374349 A1    Dec. 2, 2021

(30) Foreign Application Priority Data

Sep. 21, 2020    (CN) .................. 202010991790.X

(51) Int. Cl.
G06F 40/56    (2020.01)
G06F 40/295   (2020.01)
G06N 5/022    (2023.01)
G06N 20/00    (2019.01)

(52) U.S. Cl.
CPC .......... *G06F 40/295* (2020.01); *G06N 5/022* (2013.01); *G06N 20/00* (2019.01); *G06F 40/56* (2020.01)

(58) Field of Classification Search
CPC .............................. G10L 15/063; G06F 40/56
See application file for complete search history.

(56) References Cited

U.S. PATENT DOCUMENTS

| | | | |
|---|---|---|---|
| 2009/0054102 A1 | 2/2009 | Jung | |
| 2015/0261745 A1* | 9/2015 | Song | G06F 40/56 704/9 |
| 2018/0203852 A1 | 7/2018 | Goyal et al. | |
| 2018/0329883 A1 | 11/2018 | Leidner et al. | |
| 2019/0325066 A1* | 10/2019 | Krishna | G06F 16/3347 |
| 2020/0042547 A1 | 2/2020 | Prakash et al. | |
| 2020/0175229 A1 | 6/2020 | Iwakura et al. | |

FOREIGN PATENT DOCUMENTS

| | | |
|---|---|---|
| CN | 102360383 A | 2/2012 |
| CN | 103177036 A | 6/2013 |
| CN | 106407168 A | 2/2017 |
| CN | 107491434 A | 12/2017 |

(Continued)

OTHER PUBLICATIONS

Extended European Search Report for Application No. 21190998.1, dated Jan. 27, 2022, 9 pages.

(Continued)

*Primary Examiner* — Feng-Tzer Tzeng
(74) *Attorney, Agent, or Firm* — Lippes Mathias LLP

(57) ABSTRACT

A method for text generation, relates to a field of natural language processing, including: obtaining corpus data; labeling the corpus data to obtain a first constraint element; obtaining a first generation target; and generating a first text matching the first generation target by inputting the corpus data and the first constraint element into a generation model.

16 Claims, 9 Drawing Sheets

(56) References Cited

FOREIGN PATENT DOCUMENTS

| | | | |
|---|---|---|---|
| CN | 108170676 A | 6/2018 |
| CN | 108664465 A | 10/2018 |
| CN | 109086408 A | 12/2018 |
| CN | 110785970 A | 2/2020 |
| JP | 2020087353 A | 6/2020 |
| JP | 2020095615 A | 6/2020 |
| JP | 2020140673 A | 9/2020 |

OTHER PUBLICATIONS

Office Action for Japanese Application No. 2021-049665, dated Apr. 19, 2022, 4 pages.
First Office Action for CN application No. 202010991790.X, dated Nov. 5, 2020, 8 pages.
English translation of first Office Action for CN application No. 202010991790.X, dated Nov. 5, 2020, 8 pages.
Second Office Action for CN application No. 202010991790.X, dated Apr. 9, 2021, 8 pages.
English translation of second Office Action for CN application No. 202010991790.X, dated Apr. 9, 2021, 8 pages.
"Automatic Generation Method of Prose Poem Based on Deep Learning", 2018, 77 pages.

* cited by examiner

METHOD FOR TEXT GENERATION, DEVICE AND STORAGE MEDIUM

CROSS-REFERENCE TO RELATED APPLICATION

This application claims priority to and benefits of Chinese Patent Application Serial No. 202010991790.X, filed with the State Intellectual Property Office of P. R. China on Sep. 21, 2020, the entire content of which is incorporated herein by reference.

TECHNICAL FIELD

The present disclosure relates to a natural language processing technology of the data processing field, and particularly to a text generation method, a device and a storage medium.

BACKGROUND

Generally, writing is one of the important production activities of the human society. In the Internet age, a large amount of content of information consumption brought by auxiliary writing has become a core component of daily consumption.

In the related art, the latest hot topics are obtained from top searches and other ways and pushed to users as a reference for starting writing.

SUMMARY

According to embodiments of the present disclosure, a text generation method is provided, including: obtaining corpus data; labeling the corpus data to obtain a first constraint element; obtaining a first generation target; and generating a first text matching the first generation target by inputting the corpus data and the first constraint element into a generation model.

According to embodiments of the present disclosure, an electronic device is provided, including: at least one processor, and a memory communicatively coupled to the at least one processor; the memory is configured to store instructions executable by the at least one processor, and the instructions are executed by at least one processor to cause at least one processor to execute the method of the first aspect of embodiments.

According to embodiments of the present disclosure, a non-transitory computer-readable storage medium having computer instructions stored thereon is provided. The computer instructions are configured to make a computer execute the method of the first aspect of embodiments.

It is understandable that that the content in this part is not intended to identify key or important features of the embodiments of the present disclosure, and is not restrictive of the scope of the present disclosure. Other features of the present disclosure will be easily understood through the following specification.

BRIEF DESCRIPTION OF THE DRAWINGS

The drawings are used to better understand the solution, and are not restrictive of the disclosure, as claimed.

DETAILED DESCRIPTION

The following describes exemplary embodiments of the present disclosure with reference to the accompanying drawings, which include various details of the embodiments of the present disclosure to facilitate understanding, and should be considered as merely exemplary. Therefore, those skilled in the art should realize that various changes and modifications can be made to the embodiments described herein without departing from the scope and spirit of the present disclosure. Similarly, for clarity and conciseness, descriptions of well-known functions and structures are omitted in the following description.

Descriptions are made to a text generation method, an apparatus, a device and a storage medium according to embodiments of the present disclosure with reference to the accompany drawings.

Figure 1:
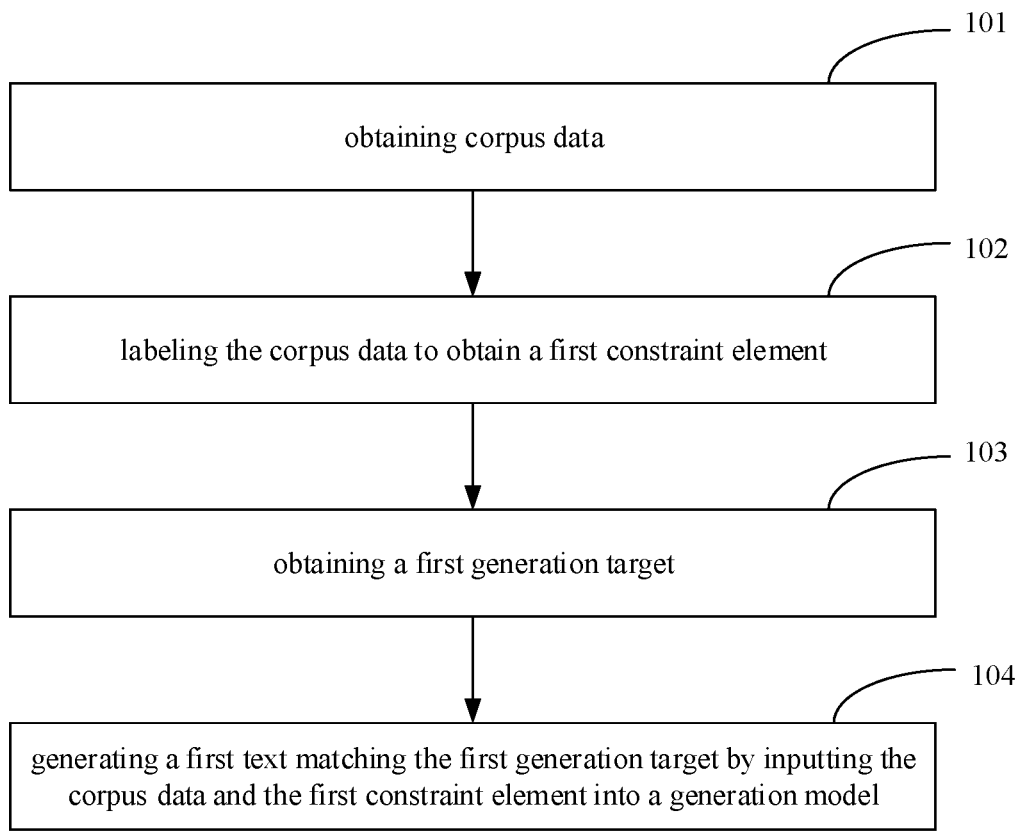
FIG. 1 is a flow chart illustrating a text generation method according to a first embodiment of the present disclosure.

FIG. 1 is a flow chart illustrating a text generation method according to a first embodiment of the present disclosure.

In the practical application, the writing auxiliary function is single. For example, the material recommendation method is generally has an association with key words, and has a weak association with the content of a specific text, which cannot meet the requirement of writing and text generation diversity.

A text generation method is provided in the present disclosure, including: obtaining corpus data; labeling the corpus data to obtain a first constraint element; obtaining a first generation target; and generating a first text matching the first generation target by inputting the corpus data and the first constraint element into a generation model.

Therefore, it is possible to provide a writer with reference that meets a generation target, improve the speed of obtaining a plan of text generation, text components such as title, introduction, abstract, and summary may be recommended, and amendment suggestions may be given for the writers' reference, thereby improving the quality of text generation. For multiple related text generation processes such as a regular periodic texts of the same type of content, and restating the same topic, the related text generation may be accelerated, realizing the diversity of text generation, meeting different needs of text generation, and improving the quality and efficiency of text generation, improving user experience. The description of the following embodiments may be referred for details.

As illustrated in FIG. 1, the text generation method may include the followings.

At block 101, corpus data is obtained.

At block 102, the corpus data is labeled to obtain a first constraint element.

In an embodiment of the present disclosure, different corpus data can be chosen according to needs in different scenarios. Entertainment news, financial news, commentaries, sentences, paragraphs, chapters and the like may be taken as the corpus data.

Taking a scenario as an example, the generation target is to generate an outline, and the corpus data may be a chapter. Taking another scenario as an example, the generation target is continuation recommendation, and the corpus data may be sentences, which can be selected and set according to actual applications.

In an embodiment of the present disclosure, there may be many ways to label the corpus data to obtain the first constraint element. Different corpus data can be labeled to obtain the first constraint element by selecting an appropriate method according to the needs of application scenarios. Examples may be as follows.

As an example, literal feature labelling may be directly performed on the corpus data to obtain literal control parameters such as sentence length such as a sentence pattern (declarative, interrogative, exclamatory). Alternatively, punctuations and mark words of the sentences in the corpus data may be directly determined to obtain literal control parameters. Alternatively, the corpus data may be classified through a preset emotion classification model to obtain a mood (statement, analysis, sensational, etc.). The above literal control parameters are regarded as the first constraint element.

For the second example, the corpus data is classified through a preset field classifier to obtain field control parameters such as science and technology, sports, society, and culture as the first constraint element.

It is to be noted that the first constraint element may be literal control parameters, including length, sentence pattern (declarative, interrogative, exclamatory, etc.), mood (statement, analysis, sensational, etc.), and the like. The first constraint element may be a style control parameter including ordinary, lively, academic, positive, negative, etc. The first constraint element may be a field control parameter, including science and technology, sports, society, culture, etc. The first constraint element may be a function control parameter including introduction, background, statement, analysis, transition, ending, etc.

In an embodiment of the present disclosure, one or more control parameters may be selected as the first constraint element according to a specific scenario. For example, the corpus data is a sentence "Is this a short sentence?", which has two control parameters "length-short" and "sentence pattern-interrogative" as the first constraint elements.

At block 103, a first generation target is obtained.

At block 104, a first text matching the first generation target is generated by inputting the corpus data and the first constraint element into a generation model.

It is to be noted that, in an embodiment of the present disclosure, the generation model is generated through training. The training method of the generation model will be disclosed in the subsequent embodiments of the present disclosure, which will not be elaborated here.

In an embodiment of the present disclosure, one or more generation targets can be selected according to needs. The generation targets include, but are not limited to, one or more kind of outline generation, text generation, reference, continuation recommendation, optimization suggestion, polishing recommendation, rhetoric suggestion, text component recommendation, and text reuse suggestion. The continuation recommendation may include full-text continuation recommendation, paragraph continuation recommendation, in-sentence continuation recommendation, etc. The optimization suggestion may include full-text optimization suggestion, paragraph optimization suggestion, and sentence optimization suggestion.

Further, after the first generation target is obtained, the corpus data and the first constraint element are input into the generation model so as to generate the first text matching the first generation target. It is understandable that the generated first text varies with the first generation target and the first constraint element. Examples are as follows.

In the first example, there are a plurality of sub models in the generation model. According to the first generation target, a first sub model matching the first generation target can be obtained from the generation model, and the corpus data and the first constraint element are input into the first sub model, then first text is generated through the first sub model.

In detail, a first material of the first sub model can be obtained according to the corpus data, and the first text is generated according to the first material and the first constraint element.

In the second example, there is one generation model. The corpus data and the first constraint element are directly input into the generation model, and the generation model generates the first text according to the generation target.

In conclusion, with the text generation method of the present disclosure, by obtaining the corpus data, labeling the corpus data to obtain the first constraint element, obtaining the first generation target, and inputting the corpus data and the first constraint element into the generation model, the first text matching the first generation target is generated. Therefore, it is possible to provide a text with a relatively strong association and generate texts with different targets, realizing the diversity of text generation, meeting different needs of text generation, and improving the quality and efficiency of text generation.

Based on the description of the above embodiments, it is understandable that the generation model is generated by pre-training and may include one or more sub generation models. A detailed training process is described with reference to FIG. 2.

Figure 2:
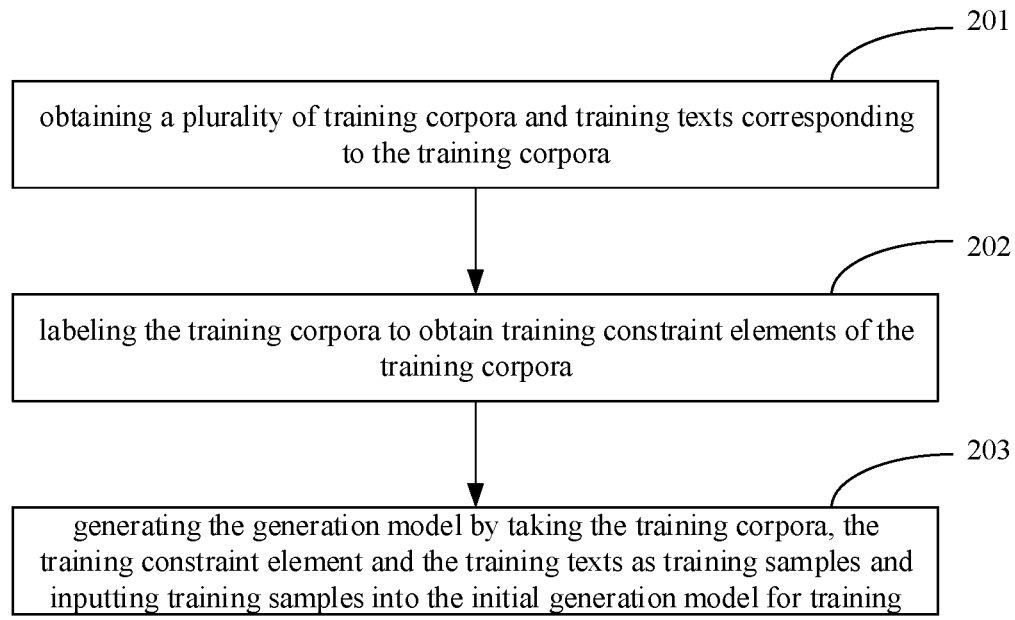
FIG. 2 is a flow chart illustrating a generation model training method according to a second embodiment of the present disclosure.

FIG. 2 is a flow chart illustrating a generation model training method according to a second embodiment of the present disclosure.

As illustrated in FIG. 2, the generation model training method includes the following.

At block 201, a plurality of training corpora and training texts corresponding to the training corpora are obtained.

At block 202, the training corpora are labeled to obtain training constraint elements of the training corpora.

In an embodiment of the present disclosure, in order to improve the accuracy of the generation model, a large number of training corpora and training texts corresponding to the training corpora can be obtained. One training corpus may correspond to a plurality of training texts. For example, a training text corresponding to sentence A includes: continuation recommendation sentence 1, sentence optimization recommendation 2 and sentence rhetoric recommendation 3 and the like, further improving the diversity of applications of generation model.

In an embodiment of the present disclosure, the training constraint element includes one or more control parameters, such as literal control parameters including length, sentence pattern (declarative, interrogative, exclamatory, etc.), mood (statement, analysis, sensational, etc.), and the like, style control parameters including ordinary, lively, academic, positive, negative, etc., field control parameters including science and technology, sports, society, culture, etc., and function control parameters including introduction, background, statement, analysis, transition, ending, etc.

In an embodiment of the present disclosure, training corpora are labeled. It is understandable that a part of the above-described control parameters may be directly labeled, such as length, and a classifier may be separately construct for other control parameters to achieve automatic labeling though rule classification or a trained text classification model.

Rule classification is to classify by literal features. For example, a sentence pattern (declarative, interrogative, exclamatory) can be directly determined by punctuations and mark words of sentences. When the control parameter cannot be simply determined by literal features, a classifier may be constructed in advance. After the text classification model is trained, parameters are labeled based on a prediction result of the text classification model.

It is to be noted that the text classification model can be trained with training text samples and corresponding classification results. For example, a training text sample X corresponds to emotion 18 and the like, a text classification model is generated by performing training with a neural network model, so that a corresponding classification of emotion 18 (such as positive, negative, etc.) may be directly obtained by inputting a text A into the text classification model. In detail, samples and classification algorithms may be selected, based on application scenarios, for training to obtain a text classification model.

In block 203, the generation model is generated by taking the training corpora, the training constraint element and the training texts as training samples, and the training samples are input into an initial generation model for training.

In an embodiment of the present disclosure, the generated generation model may be one. A plurality of training constraint elements are obtained by labeling the training corpora. For example, "Is this a short sentence?" has two control parameters "length-short" and "sentence pattern-interrogative" as the training constraint elements.

It is to be noted that, a model may be trained separately for a specific task, and a plurality of trained generation models may be generated. For example, outline generation sub model, text element (title, introduction, abstract and summary, etc.) generation sub model, text generation sub model, theme generation sub model, text continuation sub model, text polishing sub model, text rhetoric sub model, text reuse sub model and the like.

In an embodiment of the present disclosure, the training methods may be the same or different for different sub models. Examples are as follows.

In the first example, the generation model is the outline generation sub model. According to the requirement of the outline generation scenario, one or more control parameters and their value ranges (for example, length-8 bytes, etc.) may be determined as training constraint elements. The training texts and the training corpora labeled with the training constraint elements are input into the initial generation model in the form of word sequence or character sequence for training so as to generate an outline generation sub model. Thus, an input text A is input into the outline generation sub model, and then an output text B is obtained after the neural network coding and neural network decoding process. Neural network coding and neural network decoding may be a general neural network sequence generation model, such as a LSTM (Long Short-Term Memor18)-based sequence generation model, a Transformer (machine translation)-based sequence generation model and the like.

It is to be noted that text element generation sub model can also be obtained through the above training method, which will not be elaborated here.

In the second example, the generation model is the text continuation sub model. Several training corpus data can be obtained by performing a sliding window scan on the training corpora, and each training corpus datum includes several input texts and several ideal output texts. One or more control parameters and their value ranges are determined as training constraint elements according to the needs of the outline generation scenarios. Training constraint elements of each training corpus datum are added and calculated for training corpora. The training data including the training constraint elements are configured to train an ability of the training continuation sub model to predict a probability distribution of the next word through an existing text and training constraint elements. Therefore, the generated text continuation sub model can output a probability distribution of the next word for an input text.

It is to be noted that the theme generation sub model can also be obtained through the above training method, which will not be elaborated here.

In the third example, the generation model is the text polishing sub model. As for all training corpora, a denoising auto-encoder model is obtained based on a method of parallel corpora training. For example, an original text D is generated by performing randomly destruction (deleting, increasing, exchanging some words randomly) on a text C. Training is further performed based on the denoising auto-encoder model. A text of type 1 is inputted, and it is determined whether the type of an output text is 2, and a training loss is calculated, for example, through a loss function, making the model to learn how to convert the type during the generation. The training constraint element settings are superimposed in the process of calculating the training loss. Therefore, the generated text polishing sub model can process the input text 1 to obtain the output text 2, with unchanged semantics, but the input and output types are different.

It is to be noted that text rhetoric sub model can also be obtained through the above training method, which will not be elaborated here.

It is to be noted that the training corpora for the above text polishing sub model lacks of parallel corpora, thus pseudo-parallel corpora for training can be generated by using models such as the denoising auto-encoder. Introducing the training constraint elements into the model through classification loss is an additional method to introduce the training constraint elements. For example, in the style conversion generation target, when transforming style A to style B, the loss of a generation model generated by using the non-parallel corpora is calculated through an A/B-style classifier. That is, when training the generation model, a method of influencing a probability of the generation model according to different training constraint elements is learnt. In a specific task of title generation, parallel corpora are configured to train a full text→(using a pointer pointing to a structure or an object to access members in it) title generation. The learnt training constraint elements in the generation model can still be used.

In the fourth example, the generation model is the text generation sub model. According to the requirement of text generation scenarios, one or more control parameters and their value ranges may be determined as training constraint elements. The training texts and the training corpora labeled with the training constraint elements are encoded by an encoder and then inputted into an initial generation model for training so as to generate a text generation sub model. The encoding is performed according to a specific type. Data of a digital type may be directly used, and data of a text type may be encoded first. Therefore, an output text is obtained by inputting the structured data into the text generation sub model and performing neural network coding and neural network decoding process.

That is, a generation target with a parallel corpus a→b can be trained with parallel corpus, and the training target is based on the specific generation target. When the generation model of the generation target is obtained, W is input, and an output Z can be obtained based on the process of encoding and decoding. The input sequence may be a word sequence or a character sequence. For Chinese tasks, the input sequence may be word sequence which does not require word segmentation, which may be set and selected based on requirements.

Figure 3:
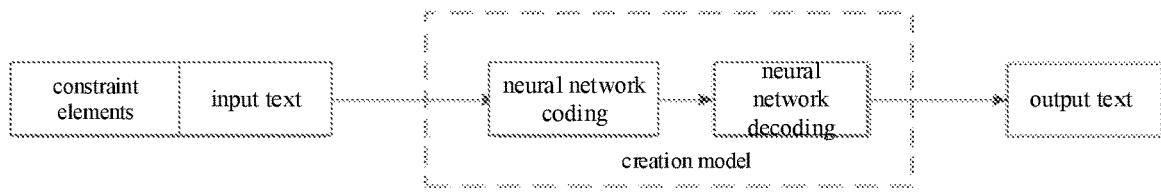
FIG. 3 is a schematic diagram illustrating a text generation method according to a second embodiment of the present disclosure.

For example, as illustrated in FIG. 3, in terms of a specific generation target, the generation target is "title generation". The input is the text content, and the output is the title, respectively corresponding to "input text" and "output text" in FIG. 3. Generation model training can be performed by using the parallel training corpora. The part labeled with dotted box is initialized by training constraint elements in the training phase. Therefore, the title generation function can also generate results through the required training constraint elements. For example, for a generation model trained by regarding three sentence patterns "declarative", "exclamatory" and "interrogative" are regarded as training constraint elements, in practical use, a certain sentence pattern can be specified, and a theme of the specified sentence can be generated for a new input text.

It is to be noted that the training corpora and the corresponding training texts can be selected according to the needs of application to obtain a corresponding generation model through one or more of the above methods.

In conclusion, with the text generation method of the present disclosure, by obtaining the plurality of training corpora and training texts corresponding to the training corpora, labeling the training corpora to obtain the training constraint elements of the training corpora, generating the generation model by taking the training corpora, the training constraint elements and the training texts as training samples, and inputting the training samples into the initial generation model for training. Therefore, the accuracy of the generation model may be ensured, and the diversity of applications of the generation model is further improved, it is possible to generate texts with a relatively close correlation and texts with different targets, realizing the diversity of text generation, meeting different requirements of text generation, and improving the quality and efficiency of text generation.

Figure 4:
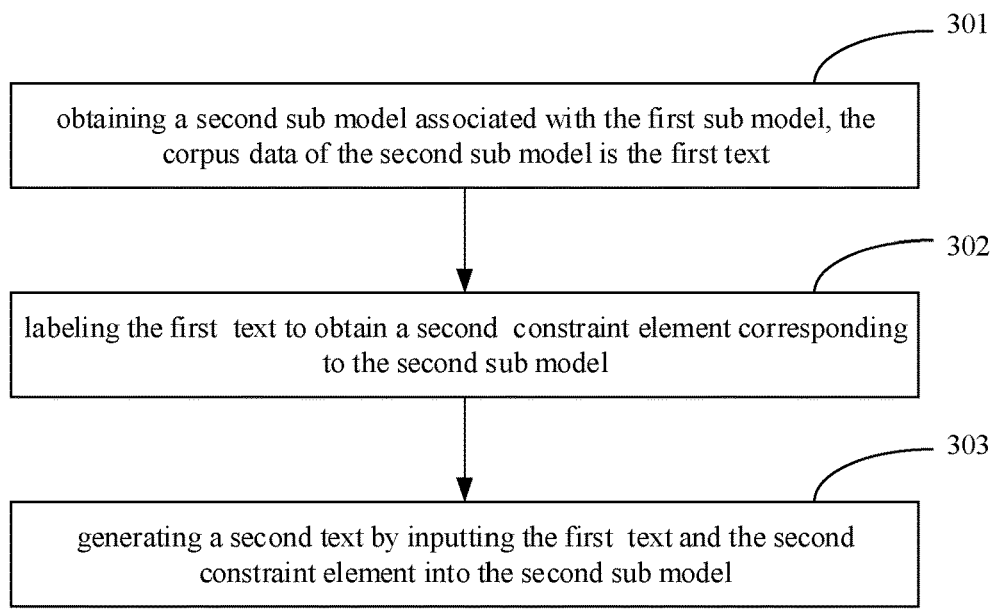
FIG. 4 is a flow chart illustrating a text generation method according to a third embodiment of the present disclosure.

Based on the description of the above embodiments, after the generation of the first text, text generation may be proceeded again. FIG. 4 is a flow chart illustrating a text generation method according to a third embodiment of the present disclosure. As illustrated in FIG. 4, after the block 104, the method further includes the following.

At block 301, a second sub model associated with the first sub model is obtained, corpus data of the second sub model is the first text.

At block 302, the first text is labeled to obtain a second constraint element corresponding to a second sub model.

At block 303, a second text is generated by inputting the first text and the second constraint element are input into the second sub model.

In an embodiment of the present disclosure, the first sub model and the second sub model can be the same or different. For example, the first sub model and the second sub model may be an outline generation sub model and a text generation sub model, or both of them may be a text polishing sub model and the like. Specifically, the first sub model and the second sub model may be associated according to the requirements of the scenario.

In an embodiment of the present disclosure, after the first text is generated, the first text can be taken as corpus data, i.e., an input, and the first text is labeled to obtain the second constraint element corresponding to the second sub model. For specific labeling method may refer to the description in the above embodiments, which will not be elaborated here.

Further, the first text and the second constraint element are input into the second sub model so as to generate the second text. It is understandable that the corresponding second sub model may be associated with the first sub model based on the generation target in advance, and then the first text and the second constraint element are processed directly through the second sub model to obtain the second text.

In conclusion, with the text generation method in the embodiments of the present disclosure, by obtaining the second sub model associated with the first sub model, the corpus data of the second sub model being the first text, the first text is labelled to obtain the second constraint element corresponding to the second sub model, and the second text is generated by inputting the first text and the second constraint element into the second sub model. Thus, text generation can be further performed based on the first text, and texts with a close relevance can be generated, thereby improving the efficiency and quality of the text generation.

Based on the description of the above embodiments, a text with one or more generation targets can be generated according to the requirements of the application scenarios, that is, the first sub model matching the first generation target can be obtained from the generation model according to the first generation target. The training corpora and the first constraint element are input into the first sub model, and the first sub model generates the first text. In detail, the first material and the first constraint element of the first sub model are obtained according to the corpus data to generate the first text. That is, different first sub models generate different first texts to meet the needs of text generation diversity. Detailed description will be given with reference to FIGS. 5-12.

Figure 5:
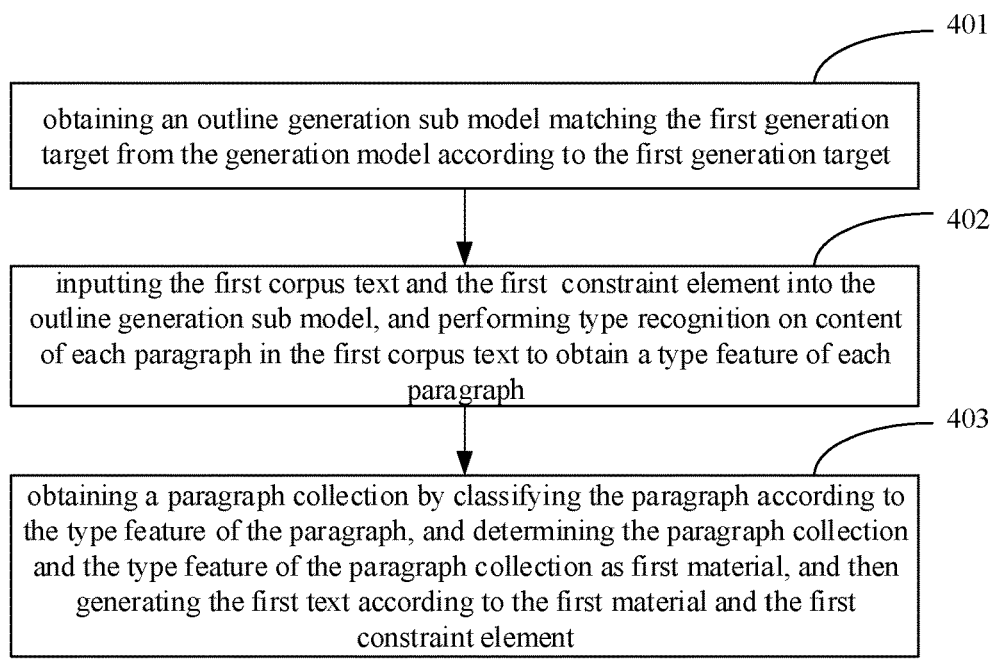
FIG. 5 is a flow chart illustrating a text generation method according to a fourth embodiment of the present disclosure.

FIG. 5 is a flow chart illustrating a text generation method according to a fourth embodiment of the present disclosure.

As illustrated in FIG. 5, the first sub model is an outline generation sub model, and the corpus data is a first corpus text, the step at block 104 includes the following.

At block 401, an outline generation sub model matching the first generation target is obtained from the generation model according to the first generation target.

AT block 402, the first corpus text and the first constraint element are input into the outline generation sub model, and type recognition is performed on content of each paragraph in the first corpus text to obtain a type feature of each paragraph.

At block 403, a paragraph collection is obtained by classifying the paragraph according to the type feature of the paragraph, and the paragraph collection and the type feature corresponding to the paragraph collection are determined as a first material, and then first text is generated according to the first material and the first constraint element.

In an embodiment of the present disclosure, the first generation target is outline generation. The outline generation sub model corresponding to the outline generation is obtained from the generation model. The first corpus text may be an article selected as needed, such as "a commentaries article". By labeling and counting paragraphs in the first corpus text, type features of the paragraphs, such as "event review", "related entity", "comments and opinions" and the like, can be generated, which can be selected and set according to actual application fields.

In an embodiment of the present disclosure, a classification system may be established based on paragraphs of the articles in an application field, and the paragraphs are labelled with function markers. Each article can be regarded as a sequence of the functional markers. The text classification model may be used to implement automatic labelling of paragraph functions. And then, the common text outline can be obtained by statistics.

That is to say, the type recognition is performed on the content of paragraphs to obtain the type features of the paragraphs, such as "event review", "relevant entity" and "comments and opinions", and then the type features corresponding to the paragraph collection can be obtained as the first material by classifying through data labelling and the text classification model. That is, different types of paragraphs may be generated based on the provided first constraint element (theme or title, etc.) and the first material, and combined into an automatically-generated outline.

In conclusion, with the text generation method in the embodiments of the present disclosure, by obtaining the outline generation sub model matching the first generation target from the generation model according to the first generation target, the first corpus text and the first constraint element are input into the outline generation sub model, type recognition is performed on the content of each paragraph in the first corpus text to obtain the type features of the paragraphs, obtaining a paragraph collection by classifying the paragraphs according to the type signatures of the paragraphs, the paragraph collection and the type signature corresponding to the paragraph collection are determined as the first material, and then the first text is generated according to the first material and the first constraint element. Thus, accurate outlines can be quickly generated to meet users' needs of text generation, and the efficiency and quality of the text generation are improved.

Figure 6:
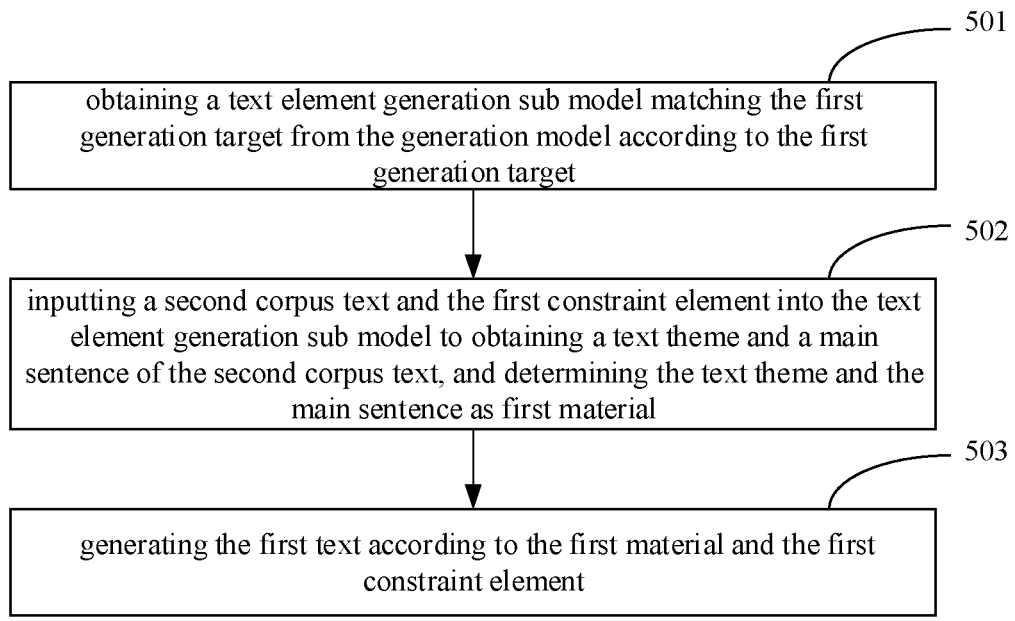
FIG. 6 is a flow chart illustrating a text generation method according to a fifth embodiment of the present disclosure.

FIG. 6 is a flow chart illustrating a text generation method according to a fifth embodiment of the present disclosure.

As illustrated in FIG. 6, the first sub model is a text element generation sub model, and the corpus data is a second corpus text. The step at the block 104 includes the following.

At block 501, a text element generation sub model matching the first generation target is obtained from the generation model according to the first generation target.

At block 502, a second corpus text and the first constraint element are input into the text element generation sub model to obtain a text theme and a main sentence of the second corpus text, and the text theme and the main sentence are determined as the first material.

At block 503, the first text is generated according to the first material and the first constraint element.

In an embodiment of the present disclosure, the generated first text is a text element such as "title", "abstract", "introduction", "label" and the like.

In an embodiment of the present disclosure, the first generation target is text element generation. The text element generation sub model corresponding to text element generation is obtained from the generation model. The second corpus text may be an article selected as needed.

That is to say, the theme of the second corpus text and the main sentence that is able to represent the theme of the second corpus text are obtained. The main sentence can be one or more sentences. Therefore, the text theme and the main sentence are determined as the first material, and the first text is generated based on a combination of first material and the first constraint element.

In conclusion, with the text generation method in the embodiments of the present disclosure, by obtaining the text element generation sub model matching the first generation target from the generation model according to the first generation target, the first corpus text and the first constraint element are input into the text element generation sub model, the text theme and the main sentence of the second corpus text are obtained, the text theme and the main sentence are determined as the first material, and then the first text is generated according to the first material and the first constraint element. As a result, accurate text elements can be quickly generated to meet users' needs of text generation, and the efficiency and quality of the text generation is improved.

Figure 7:
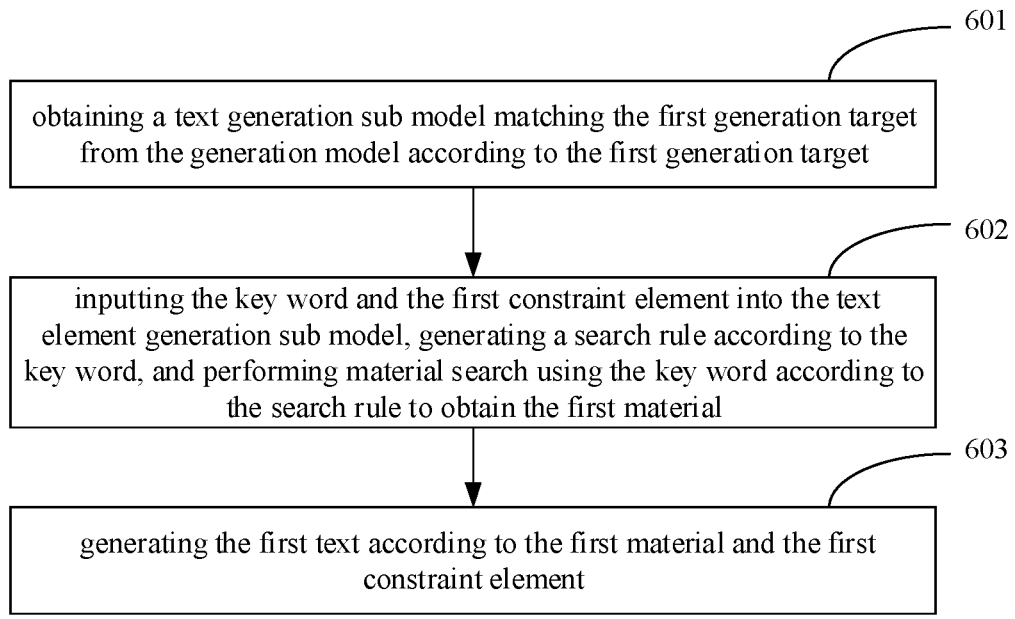
FIG. 7 is a flow chart illustrating a text generation method according to a sixth embodiment of the present disclosure.

FIG. 7 is a flow chart illustrating a text generation method according to a sixth embodiment of the present disclosure.

As illustrated in FIG. 7, the first sub model is a text generation sub model, and the corpus data is a key word. The step at the block 104 includes the following.

At block 601, a text generation sub model matching the first generation target is obtained from the generation model according to the first generation target.

At block 602, the key word and the first constraint element are input into the text element generation model, a search rule is generated according to the keyword, and a material search is performed using the key word according to the search rule to obtain the first material.

At block 603, the first text is generated according to the first material and the first constraint element.

In an embodiment of the present disclosure, the search rule can be set according to the scenarios, such as search time, search times, search data and the like.

In an embodiment of the present disclosure, the first generation target is text generation. The text generation sub model corresponding to the text generation can be obtained from the generation model, and the key word may be a phrase selected as needed.

In an embodiment of the present disclosure, a text generation in relatively fixed form can be performed. For example, when the key word is "review of daily financial news", the first material can be obtained according to a certain designated method. For example, the key word is "review of daily financial news", a possible method of obtaining the first material is to obtain "financial" news and day's changes of the financial indexes from data sources at 5 p.m. every day. The material is converted into paragraphs through technologies such as chapter clustering, automatic abstract, text generation based on structured data and the like, and then the first text is generated. Commonly used technical means include automatic abstract, converting existing chapters into paragraphs, or text generation based on structured data converting data into paragraphs.

As an example, for an automatic abstract algorithm, chapters are input and paragraphs are output. For example, the key word is "review of daily financial news". Paragraphs may be extracted from a plurality of material articles separately. The step of "paragraph extraction" is finished by the automatic abstract algorithm, and the first constraint element may be complete model generation/model generation in combination with original text extraction/complete original text extraction, and the like.

As an another example, for text generation based on structured data, data is input and paragraphs are output, and the first constraint elements may be controlled as "show all data/showing partial data", "formal data description/colloquial data description" and the like.

It is to be noted that "complete model generation/model generation in combination with original text extraction/complete original text extraction" and "show all data/show partial data" can be directly supplemented into the training corpora by simple rules to generate the text generation sub model, and "formal data description/colloquial data description" may be supplemented into the training corpora by additional data annotation and text classification model training to generate the text generation sub model.

In conclusion, with the text generation method in the embodiments of the present disclosure, by obtaining the text generation sub model matching the first generation target from the generation model according to the first generation target, the key word and the first constraint element are input into the text element generation sub model, the search rule is generated according to the key word, and the material search is performed using the key word according to the search rule to obtain the first material, and then the first text is generated according to the first material and the first constraint element. Thus, accurate texts can be quickly generated to meet users' needs of text generation, and the efficiency and quality of the text generation are improved.

Figure 8:
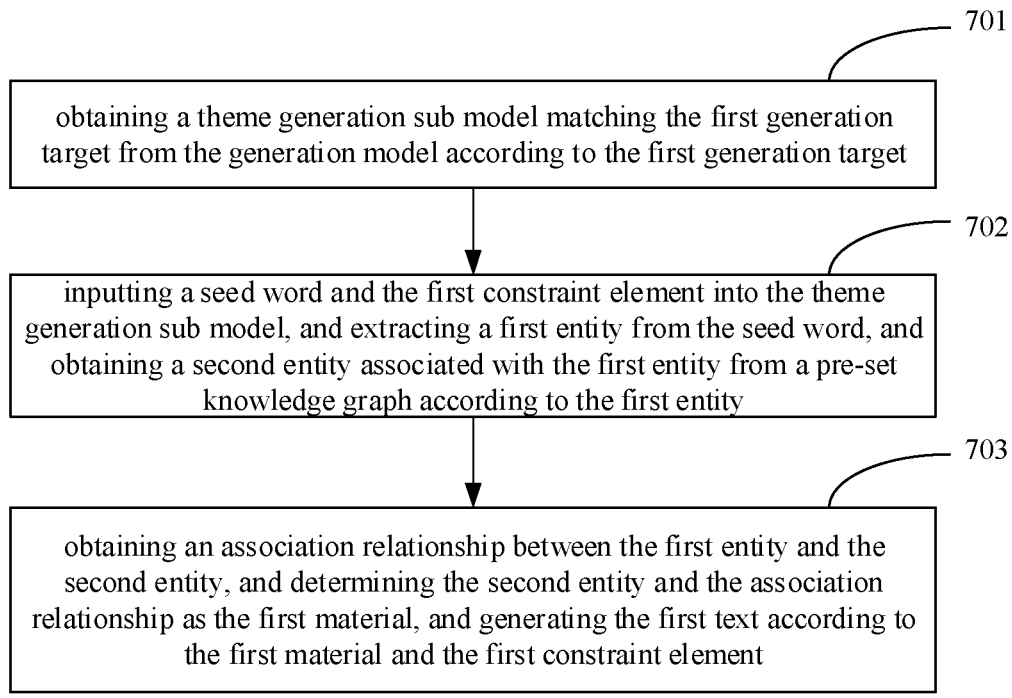
FIG. 8 is a flow chart illustrating a text generation method according to a seventh embodiment of the present disclosure.

FIG. 8 is a flow chart illustrating a text generation method according to a seventh embodiment of the present disclosure.

As illustrated in FIG. 8, the first sub model is a theme generation sub model and the corpus data is a seed word. The step at the block 104 includes the following.

At block 701, a theme generation sub model matching the first generation target is obtained from the generation model according to the first generation target.

At block 702, a seed word and the first constraint element are input into the theme generation sub model, a first entity is extracted from the seed word, and a second entity associated with the first entity is obtained from a preset knowledge graph according to the first entity.

At block 703, an association relationship between the first entity and the second entity is obtained, and the second entity and the association relationship are determined as the first material. The first text is generated according to the first material and the first constraint element.

In an embodiment of the present disclosure, the first generation target is theme generation. The theme generation sub model corresponding to theme generation can be obtained from the generation model.

In an embodiment of the present disclosure, starting from a seed word (such as phrases, events, etc.) specified by a user or a writer, a relevant concept is recommended by the preset knowledge graph recommends, and writing fragments are recommended by the theme generation sub model. The user or the writer can keep the recommended content that meets the expectations, and continue to obtain the recommended content until the preparation of text generation is completed, and the selected content is used as a reference for actual text generation.

For example, the seed word may be input by a user, such as entertainment news (type), Xiao Ming (person), Xiaohua comments on Xiao Ming (event) and the like, the seed word may also be recommended based on popularity.

In an embodiments of the present disclosure, the knowledge graph is entity relationships and entity attributes based on the entity associations. From an entity corresponding to the input seed word, an associated entity can be recommended. Alternatively, a segment can be directly generated from the seed word. i.e., the theme generation sub model can predict a probability of a next character/word based on the current content.

Therefore, it is possible to expand relevant content by taking the seed word such as a keyword/a phrase/an event as the core, to construct text generation ideas, and improve efficiency of text generation.

In conclusion, with the text generation method in the embodiments of the present disclosure, by obtaining the theme generation sub model matching the first generation target from the generation model according to the first generation target, the seed word and the first constraint element are input into the theme generation sub model, the first entity is extracted from the seed word, the second entity associated with the first entity is obtained from the preset knowledge graph according to the first entity, the association relationship between the first entity and the second entity, the second entity and the association relationship are determined as the first material, and then the first text is generated according to the first material and the first constraint element. Thus, a recommendation text can be quickly generated to meet users' needs of text generation, and the efficiency and quality of the text generation are improved.

Figure 9:
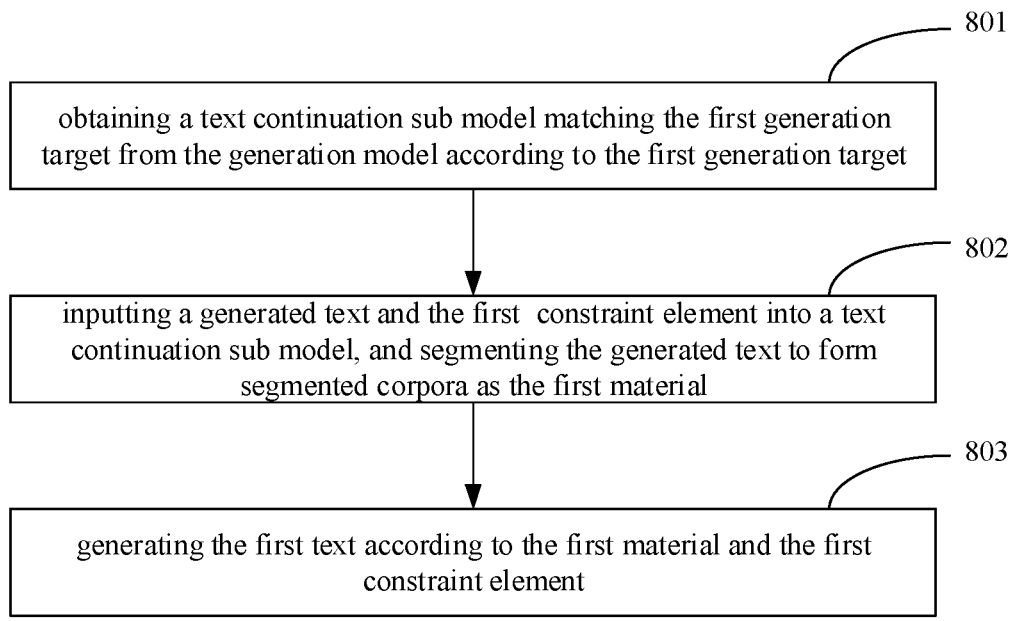
FIG. 9 is a flow chart illustrating a text generation method according to an eighth embodiment of the present disclosure.

FIG. 9 is a flow chart illustrating a text generation method according to an eighth embodiment of the present disclosure.

As illustrated in FIG. 9, the first sub model is a text continuation sub model and the corpus data is a generated text. The step at the block 104 includes the following.

At block 801, a text continuation sub model matching the first generation target is obtained from the generation model according to the first generation target.

AT block 802, a generated text and the first constraint element are input into a text continuation sub model, and the generated text is segmented to form segmented corpora as the first material.

At block 803, the first text is generated according to the first material and the first constraint element.

In an embodiment of the present disclosure, the first generation target is text continuation. The text continuation sub model corresponding to the text continuation obtained is selected from the generation model. The generated text may be selected as needed.

In an embodiment of the present disclosure, the segmented corpora can be one or more of a sentence, a paragraph, a chapter and the like. The first text is generated by using the first constraint element and the first material, such as sentences, paragraphs, or chapters as input.

In an embodiment of the present disclosure, the text continuation can be a full-text continuation recommendation, that is, samples of the subsequent paragraphs are recommended based on the completed paragraph. Alternatively, the text continuation can be a paragraph continuation recommendation, that is, a sample related to a completed paragraph or a writing method is recommended based on a part of the completed paragraph. Alternatively, the text continuation can also be in-sentence continuation recommendation, that is, a subsequent writing method of a sentence is recommended based on a completed part of the sentence.

It is to be noted that, in order to enhance the practicality, the text continuation sub model may be using the content prepared by the user during the text-generation preparation stage or a key word additionally specified as constraints.

In conclusion, with the text generation method in the embodiments of the present disclosure, by obtaining the text continuation sub model matching the first generation target from the generation model according to the first generation target, the generated text and the first constraint element are input into the text continuation sub model, the generated text is segmented to form segmented corpora as the first material, and then the first text is generated according to the first material and the first constraint element. Thus, the accurate continuation recommendation texts can be quickly generated to meet users' needs of text generation, and the efficiency and quality of the text generation is improved.

Figure 10:
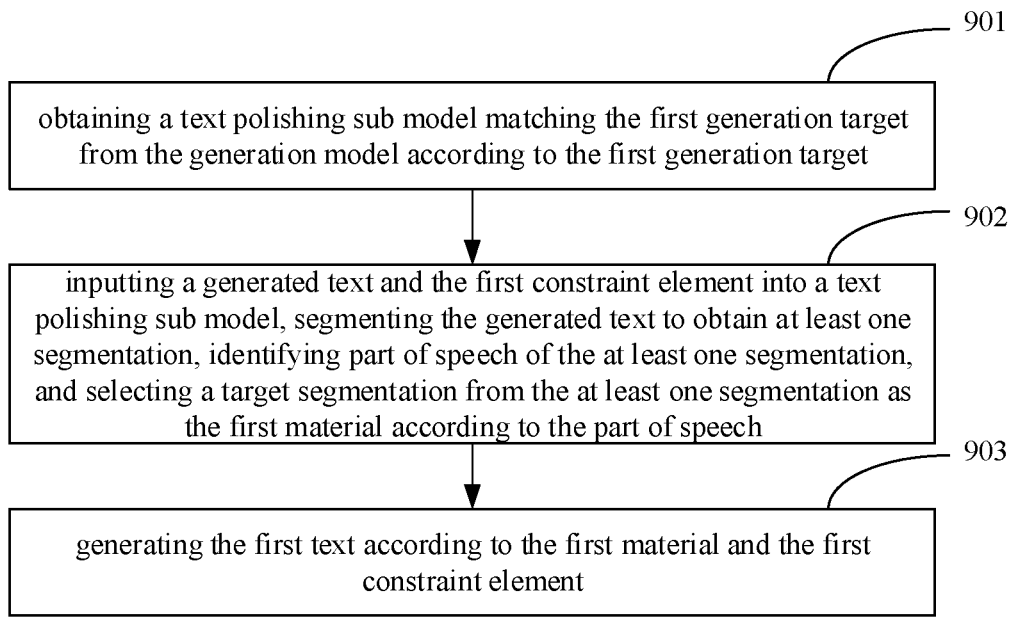
FIG. 10 is a flow chart illustrating a text generation method according to a ninth embodiment of the present disclosure.

FIG. 10 is a flow chart illustrating a text generation method according to a ninth embodiment of the present disclosure.

As illustrated in FIG. 10, the first sub model is a text polishing sub model and the corpus data is a generated text, the step at the block 104 includes the following.

At block 901, a text polishing sub model matching the first generation target is obtained from the generation model according to the first generation target.

At block 902, a generated text and the first constraint element are input into a text polishing sub model, the generated text is segmented to obtain at least one segmentation, part of speech of the at least one segmentation is identified, and a target segmentation is selected from the at least one segmentation as the first material according to the part of speech.

At block 903, the first text is generated according to the first material and the first constraint element.

In an embodiment of the present disclosure, the first generation target is text polishing. The text polishing sub model corresponding to the text polishing is obtained from the generation model, and the generated text may be selected as needed.

In an embodiment of the present disclosure, not all words are replaced. The target segmentation may be selected from the segmentations according to the part of speech (for example, positive, negative, etc.) as the first material so as to improve the efficiency of the text generation.

In an embodiment of the present disclosure, based on high-quality text corpus, the text polishing sub model may generate a plurality of polishing and rewriting results (for example, changing styles) for one sentence for the user's reference, concentrating on the changes on the word level, i.e. word level optimization.

For example, for an in-sentence polishing recommendation, a word-granularity polishing solution is recommended based on a completed sentence part.

In conclusion, with the text generation method in the embodiments of the present disclosure, by obtaining the text polishing sub model matching the first generation target from the generation model according to the first generation target, the generated text and the first constraint element are input into the text polishing sub model, the content of the generated text is segmented to obtain at least one segmentation, the part of speech of the at least one segmentation is identified, and the target segmentation is selected from the at least one segmentation as the first material according to the part of speech, and then the first text is generated according to the first material and the first constraint element. Thus, the generated text may be polished to meet users' needs of text generation, and the efficiency and quality of the text generation are improved.

Figure 11:
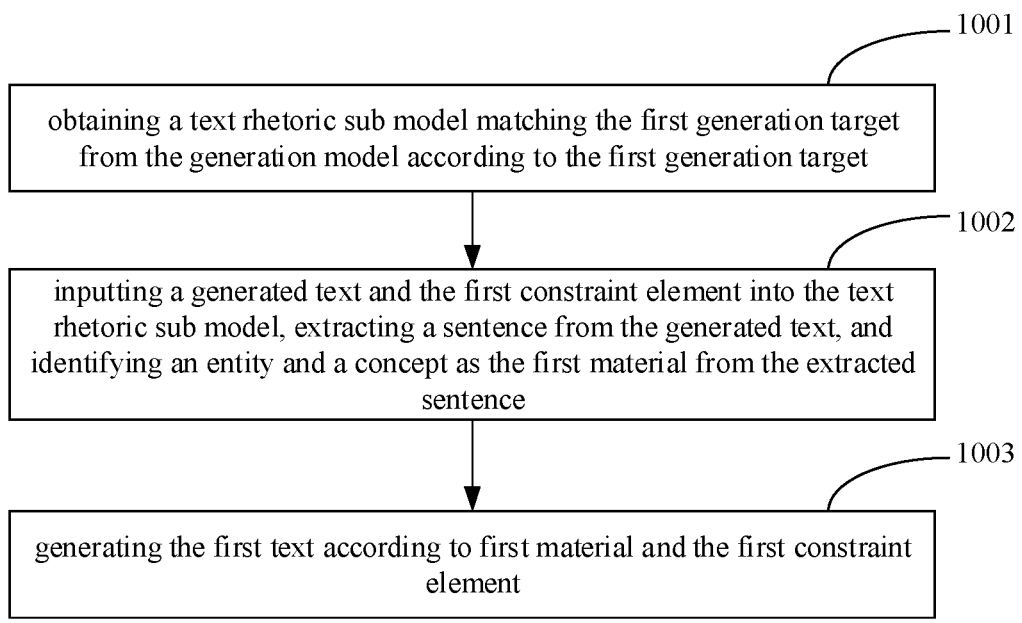
FIG. 11 is a flow chart illustrating a text generation method according to a tenth embodiment of the present disclosure.

FIG. 11 is a flow chart illustrating a text generation method according to a tenth embodiment of the present disclosure.

As illustrated in FIG. 11, the first sub model is a text rhetoric sub model and the corpus data is a generated text, the block 104 includes: At block 1001, a text rhetoric sub model matching the first generation target is obtained from the generation model according to the first generation target.

At block 1002, a generated text and the first constraint element are input into a text rhetoric sub model, and a sentence is extracted from the generated text, and an entity and a concept are identified as the first material from the extracted sentence.

At block 1003, the first text is generated according to the first material and the first constraint element.

In an embodiment of the present disclosure, the first generation target is text rhetoric. The text rhetoric sub model corresponding to the text rhetoric is obtained from the generation model, and the generated text may be selected as needed.

In an embodiment of the present disclosure, the use of simile, quotation and other rhetoric can improve the quality of the text generation result. Based on the generated text, the entity, the concept and the like can be identified as the first material. For example, "sun" is an entity and "weather" is a concept. The corresponding rhetoric content, i.e., the first text, is generated based on the first material in combination with the first constraint element, for the reference of users.

For example, for in-sentence rhetoric recommendation, rhetoric recommendations such as simile, quotation and other rhetoric are provided for a completed sentence part.

In conclusion, with the text generation method in the embodiments of the present disclosure, by obtaining the text rhetoric sub model matching the first generation target from the generation model according to the first generation target, the generated text and the first constraint element are input into the text rhetoric sub model, the senesce is extracted from the generated text, entities and concepts are extracted from the sentence and determined as the first material, and then the first text is generated according to the first material and the first constraint element. Thus, rhetoric process can be performed to the generated text to meet users' needs of text generation, and the efficiency and quality of the text generation are improved.

Figure 12:
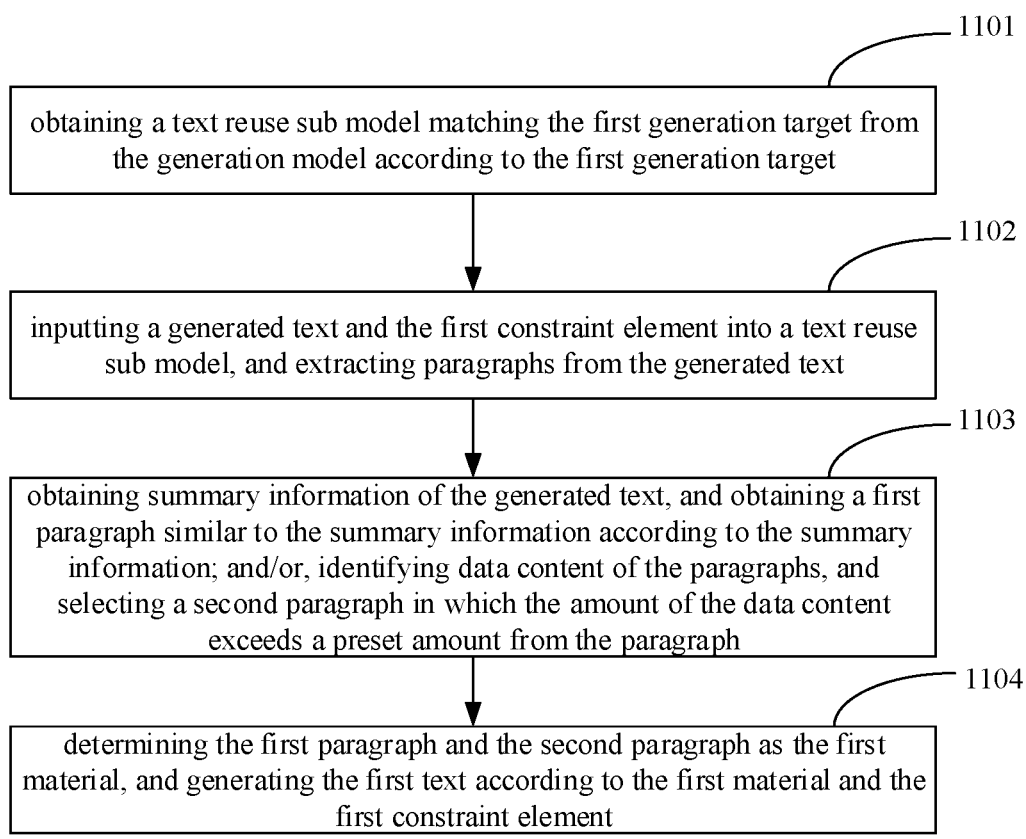
FIG. 12 is a flow chart illustrating a text generation method according to an eleventh embodiment of the present disclosure.

FIG. 12 is a flow chart illustrating a text generation method according to an eleventh embodiment of the present disclosure.

As illustrated in FIG. 12, the first sub model is a text reuse sub model, and the corpus data is a generated text, the block 104 includes the following.

At block 1101, a text reuse sub model matching the first generation target is obtained from the generation model according to the first generation target.

At block 1102, a generated text and the first constraint element are input into a text reuse sub model, and paragraphs are extracted from the generated text.

At block 1103, summary information of the generated text is obtained, and a first paragraph similar to the summary information is obtained according to the summary information; and/or, data content of the paragraphs are identified, and a second paragraph is selected from the paragraphs, the amount of the data content in the second paragraph exceeds a preset amount.

At block 1104, the first paragraph and the second paragraph are determined as the first material. The first text is generated according to first material and the first constraint element.

In an embodiment of the present disclosure, the first generation target is text reuse. The text reuse sub model corresponding to the text reuse is obtained from the generation model, and the generated text may be selected as needed.

In an embodiment of the present disclosure, after the text generation, data-intensive paragraphs in the generated text or the content highly similar to the generated text are identified according to the analysis to the generated text, it is recommended that the user may try to use the automatic writing method to complete subsequent writing of similar paragraphs. The preset amount is set according to needs of applications.

For example, when there is a large amount of data-type content in a certain paragraph is identified, for example, identifying by a preset rule, such as counting the number of repetitions of words, etc., it is recommended that user may try to use an automatic writing method to complete subsequent writing of similar paragraphs.

In conclusion, with the text generation method in the embodiments of the present disclosure, by obtaining the text reuse sub model matching the first generation target from the generation model according to the first generation target, the generated text and the first constraint element are input into the text reuse sub model, the paragraphs are extracted from the generated text, summary information of the generated text is obtained, and the first paragraph similar to the summary information is obtained according to the summary information, and/or, data content of the paragraphs is identified, and a second paragraph in which the amount of data content exceeds a preset amount is selected from the paragraph, the first paragraph and the second paragraph are determined as the first material, and then the first text is generated according to the first material and the first constraint element. Thus, the generated text may be reused to meet users' needs of text generation, and the efficiency and quality of the text generation are improved.

Based on the description of the above embodiments, the sub model can be added, deleted, and modified according to different usage scenarios, users, and application fields. For example, the artificial intelligence sub model can also be used to identify predefined questions in various levels of corpus data such as sentences, paragraphs, chapters and the like, and suggestions for review and modification may be given based on the identification, such as paragraph length, relationships between paragraphs or sentences, and grammatical optimization, sentence length, misuse of punctuation, paragraph segmentation and image density and the like.

Based on the description of the above embodiments, with the text generation method in the present disclosure, the auxiliary recommendation and information of artificial intelligence can be obtained at each block from the beginning to the end of the text generation process, and the proposal of the artificial intelligence may be referred to or adopted according to actual needs, which has a good human-computer collaboration. In addition, the recommendation information provided at each block of the text generation has a strong correlation with the completed text content and the content being generated, which can avoid the user's transformation of thought between the writing content and the reference content, so that the user can focus on his own creation, and the generated texts are more controllable and diversified.

To realize the above embodiments, a text generation apparatus is provided in the present disclosure.

Figure 13:
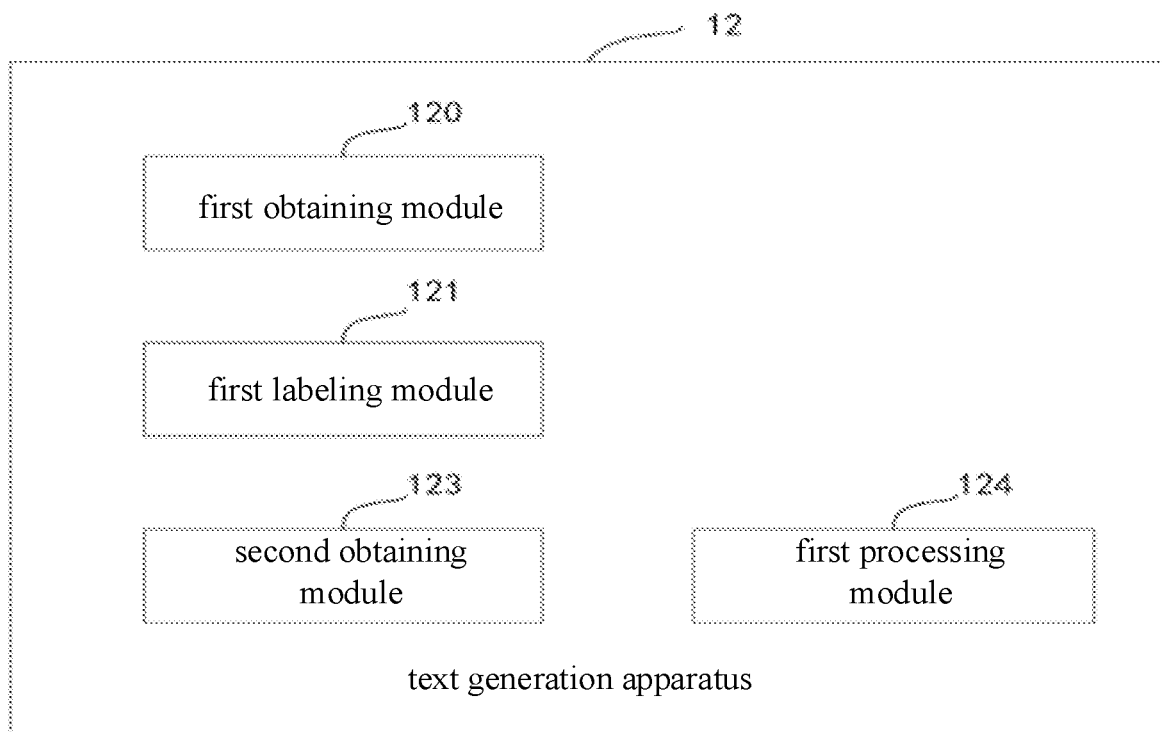
FIG. 13 is a block diagram illustrating a text generation apparatus according to a twelfth embodiment of the present disclosure.

FIG. 13 is a schematic diagram illustrating a text generation apparatus according to a twelfth embodiment of the present disclosure.

As illustrated in FIG. 13, the text generation apparatus 12 may include a first obtaining module 120, a first labeling module 121, a second obtaining module 123 and a first processing module 124.

The first obtaining module 120 is configured to obtain corpus data.

The first labeling module 121 is configured to label the corpus data to obtain a first constraint element.

The second obtaining module 123 is configured to obtain a first generation target.

The first processing module 124 is configured to generate a first text matching the first generation target by inputting the corpus data and the first constraint element into a generation model.

Figure 14:
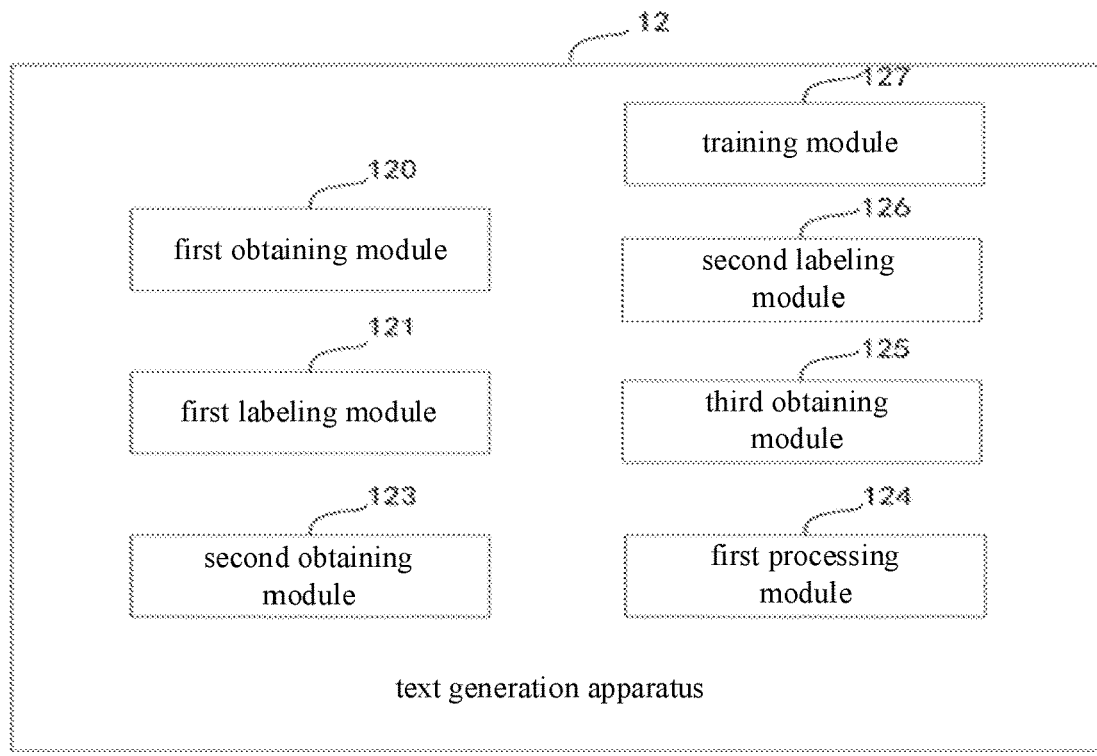
FIG. 14 is a block diagram illustrating a text generation apparatus according to a thirteenth embodiment of the present disclosure.

In an embodiment of the present disclosure, as illustrated in FIG. 14, on the basis of FIG. 13, the apparatus further includes a third obtaining module 125, a second labeling module 126 and a training module 127.

The third obtaining module 125 is configured to obtain a plurality of training corpora and training texts corresponding to the training corpora.

The second labeling module 126 is configured to label the training corpora to obtain training constraint elements of the training corpora.

The training module 127 is configured to generate the generation model by taking the training corpora, the training constraint elements and the training texts as training samples and inputting the training samples into an initial generation model for training.

Figure 15:
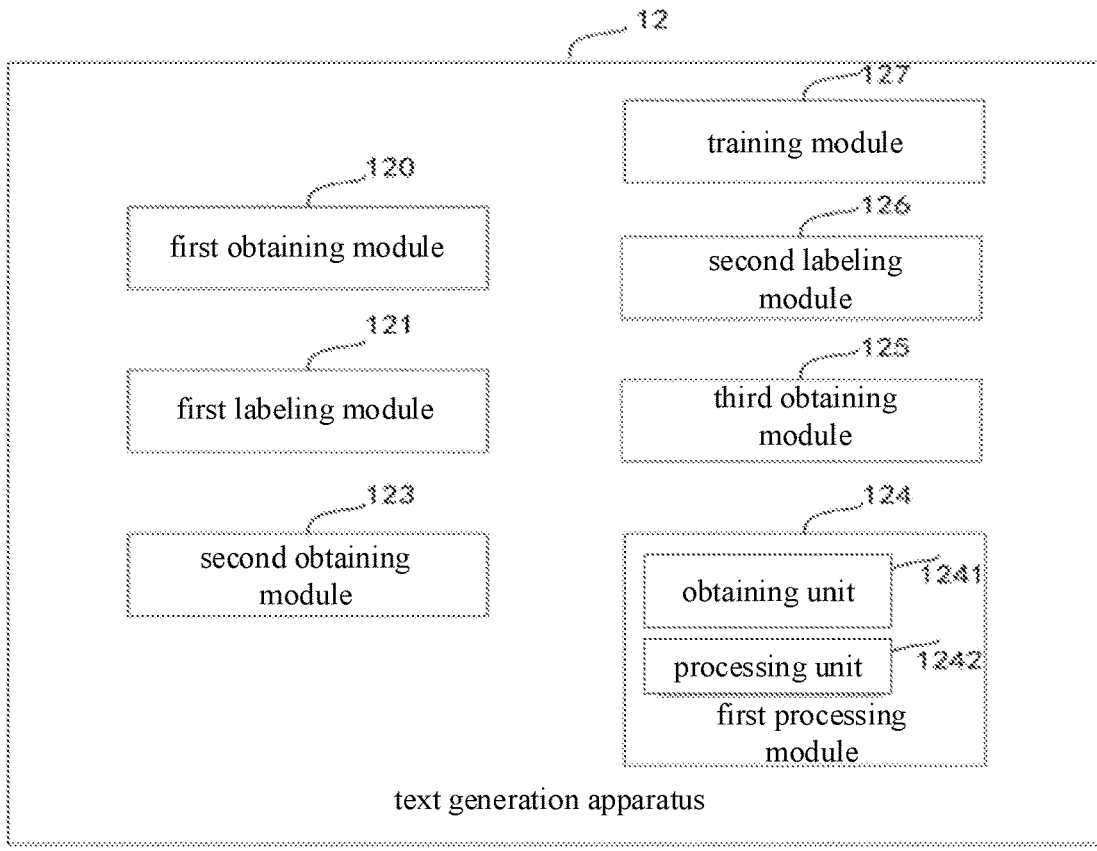
FIG. 15 is a block diagram illustrating a text generation apparatus according to a fourteenth embodiment of the present disclosure.

In an embodiment of the present disclosure, as illustrated in FIG. 15, on the basis of FIG. 14, the first processing module 124 include an obtaining unit 1241 and a processing unit 1242.

The obtaining unit 1241 is configured to obtain a first sub model matching the first generation target from the generation model according to the first generation target.

The processing unit 1242 is configured to input the corpus data and the first constraint element into the first sub model, and generate the first text by the first sub model.

Figure 16:
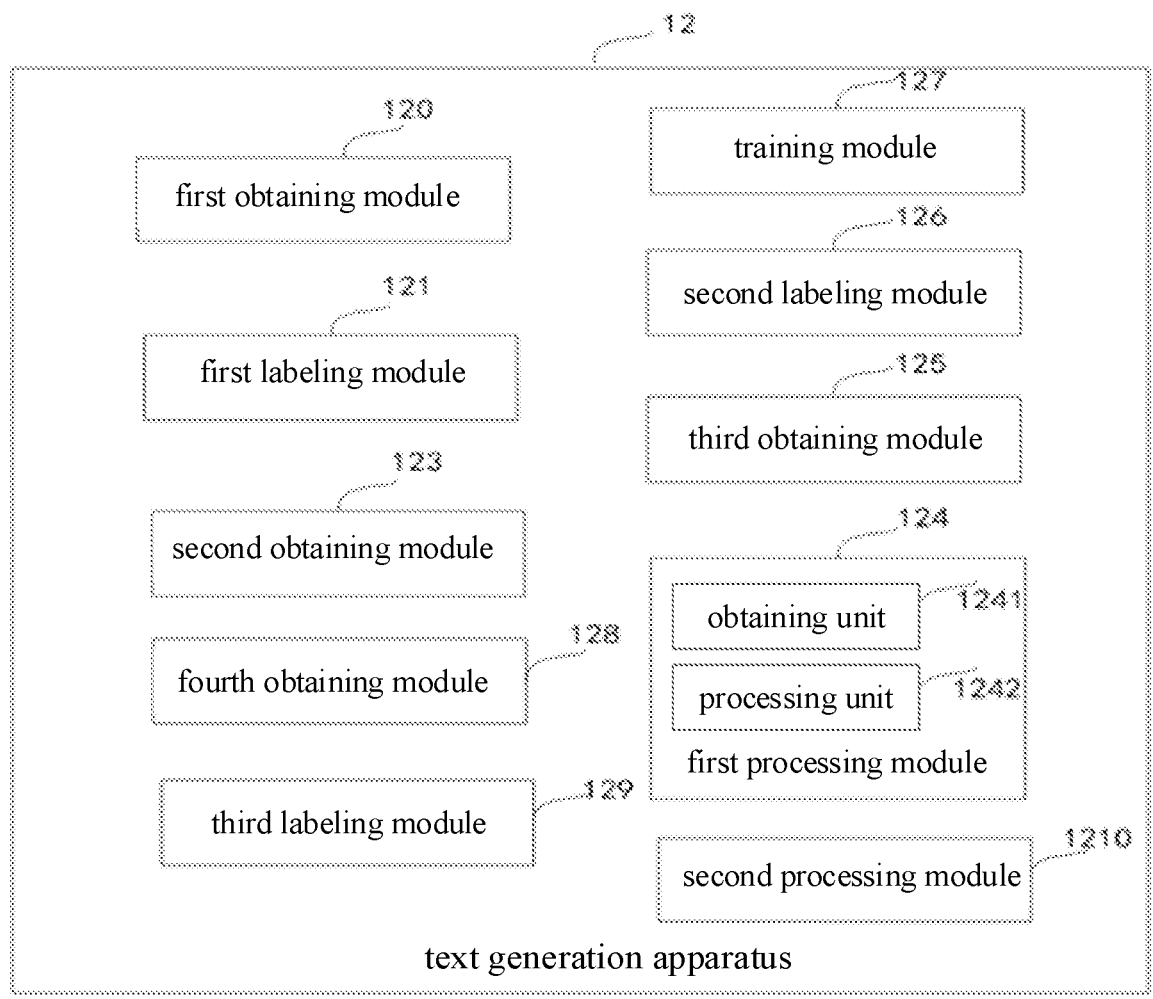
FIG. 16 is a block diagram illustrating a text generation apparatus according to a fifteenth embodiment of the present disclosure.

In an embodiment of the present disclosure, as illustrated in FIG. 16, on the basis of FIG. 15, the apparatus further includes a fourth obtaining module 128, a third labeling module 129 and a second processing module 1210.

The fourth obtaining module 128 is configured to obtain a second sub model associated with the first sub model, the corpus data of the second sub model is the first texts.

The third labeling module 129 is configured to label the first text to obtain a second constraint element corresponding to the second sub model.

The second processing module 1210 is configured to generate a second text by inputting the first text and the second constraint element into the second sub model.

Figure 17:
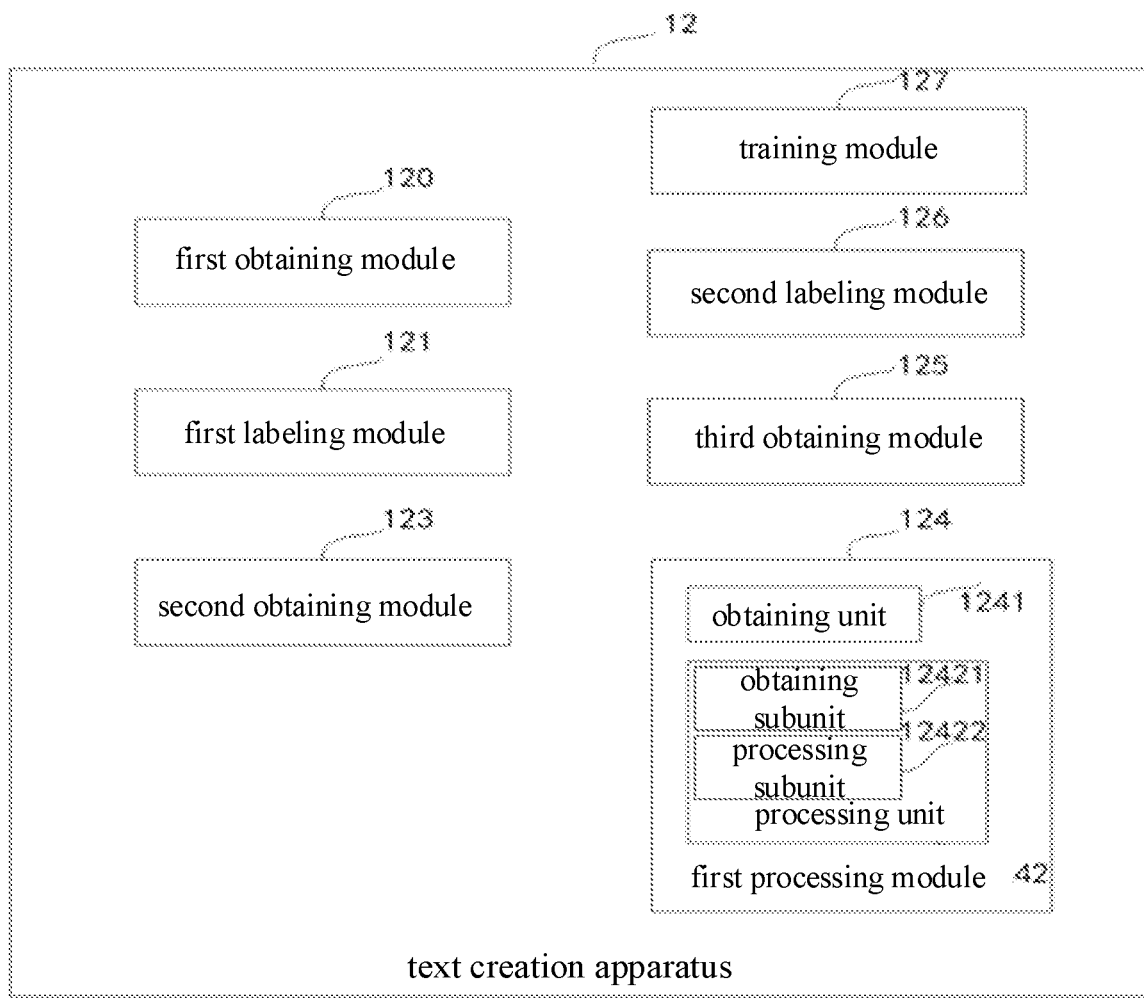
FIG. 17 is a block diagram illustrating a text generation apparatus according to a sixteenth embodiment of the present disclosure.

In an embodiment of the present disclosure, as illustrated in FIG. 17, on the basis of FIG. 15, the processing unit 1242 includes an obtaining subunit 12421 and a generating subunit 12422.

The obtaining subunit 12421 is configured to obtain a first material of the first sub model according to the corpus data.

The generating subunit 12422 is configured to generate the first text according to the first material and the first constraint element.

In an embodiment of the present disclosure, the first sub model is an outline generation sub model and the corpus data is a first corpus text. The obtaining subunit 12421 is configured to: perform type recognition on content of each paragraph in the first corpus text to obtain a type feature of each paragraph; obtain a paragraph collection by classifying the paragraph according to the type feature of the paragraph; and determine the paragraph collection and the type feature of the paragraph collection as the first material.

In an embodiment of the present disclosure, the first sub model is a text element generation sub model, and the corpus data are second corpus texts. The obtaining subunit 12421 is configured to: obtain a text and a main sentence of the second corpus text, and determine the text theme and the main sentence as the first material.

In an embodiment of the present disclosure, the first sub model is a text generation sub model and the corpus data is a key word. The obtaining subunit 12421 is configured to: generate a search rule according to the key word, and perform a material search using the key word according to the search rule to obtain the first material.

In an embodiment of the present disclosure, the first sub model is a theme generation sub model and the corpus data is a seed word. The obtaining subunit 12421 is configured to: extract a first entity from the seed word; obtain a second entity associated with the first entity from a preset knowledge graph according to the first entity; and obtain an association relationship between the first entity and the second entity, and determine the second entity and the association relationship as the first material.

In an embodiment of the present disclosure, the first sub model is a text continuation sub model, and the corpus data is a generated text. The obtaining subunit 12421 is configured to: segment the generated text to form segmented corpora as the first material.

In an embodiment of the present disclosure, the first sub model is a text polishing sub model, and the corpus data is a generated text. The obtaining subunit 12421 is configured to: segment content of the generated text to obtain at least one segmentation; and identify part of speech of the at least one segmentation, and select a target segmentation from the at least one segmentation as the first material according to the part of speech.

In an embodiment of the present disclosure, the first sub model is a text rhetoric sub model, and the corpus data is a generated text. The obtaining subunit 12421 is configured to: extract a sentence from the generated text, and identify an entity and a concept from the extracted sentence as the first material.

In an embodiment of the present disclosure, the first sub model is a text reuse sub model and the corpus data is a generated text. The obtaining subunit 12421 is configured to: obtain the generated text and extract paragraphs from the generated text; obtain summary information of the generated text, and obtain a first paragraph similar to the summary information from the paragraphs according to the summary information; and/or, identify data content of the paragraphs, and select a second paragraph from the paragraphs, the amount of which the data content in the second paragraph exceeds a preset amount; and determine the first paragraph and the second paragraph as the first material.

In conclusion, with the text generation apparatus in the present disclosure, by obtaining the corpus data, labeling the corpus data to obtain the first constraint element, obtaining a first generation target, and inputting the corpus data and the first constraint element into the generation model, the first text matching the first generation target is generated. Therefore, it is possible to provide a text with a relatively strong association and generate texts with different targets, realizing the diversity of text generation, meeting different needs, and improving the quality and efficiency of text generation.

According to the embodiments of the present disclosure, the present disclosure also provides an electronic device and a readable-storage medium.

Figure 18:
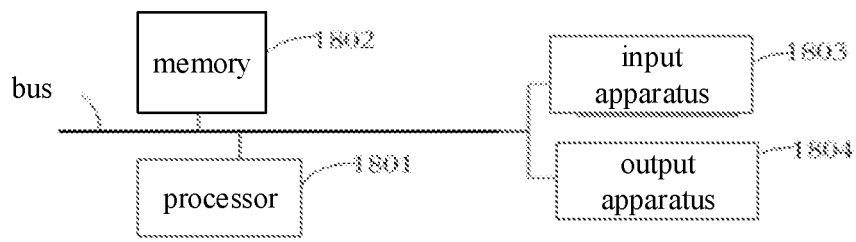
FIG. 18 is a schematic diagram illustrating an electronic device for implementing a text generation method in an embodiment of the present disclosure.

FIG. 18 is a block diagram illustrating an electronic device for implementing the text generation method according to an exemplary embodiment. The electronic device is intended to represent various forms of digital computers, such as a laptop computer, a desktop computer, a work table, a personal digital assistant, a server, a blade server, a mainframe computer, and other suitable computers. The electronic device can also represent various forms of mobile devices, such as a personal digital processor, a cellular phone, a smart phone, a wearable device, and other similar computing devices. The components illustrated herein, their connections and relationships, and their functions are merely examples, and are not intended to limit the implementation of the disclosure described and/or required herein.

As illustrated in FIG. 18, the electronic device includes one or more processors 1801, a memory 1802, and interfaces for connecting various components, including high-speed interfaces and low-speed interfaces. The various components are connected to each other by different buses, and can be installed on a common motherboard or installed in other ways as needed. The processor may process instructions executed in the electronic device, including instructions stored in or on the memory to display graphical information of the GUI on an external input/output apparatus, such as a display device coupled to an interface. In other embodiments, when necessary, a plurality of processors and/or a plurality of buses can be used in combination with a plurality of memories. Similarly, a plurality of electronic devices can be connected, and each device provides some necessary operations (for example, as a server array, a group of blade servers, or a multi-processor system). In FIG. 18, one processor 1801 is taken as an example.

The memory 1802 is a non-transitory computer-readable storage medium provided by the disclosure. The memory stores instructions executable by the at least one processor, so that the at least one processor implements the text generation method provided by the present disclosure. The non-transitory computer-readable storage medium of the present disclosure has computer instructions stored thereon, in which the computer instructions are used to cause a computer to implement the text generation method provided by the present disclosure.

As a non-transitory computer-readable storage medium, the memory 1802 can be used to store non-transitory software programs, non-transitory computer-executable programs and modules, such as program instructions/modules corresponding to the text generation method in the embodiments of the present disclosure (for example, the first obtaining module 120, the first labeling module 121, the second obtaining module 123, and the first processing module 124 illustrated in FIG. 13). The processor 1801 implements various functional applications and data processing of the server, that is, implements the text generation method in the above method embodiments, by running non-transitory software programs, instructions, and modules stored in the memory 1802.

The memory 1802 may include a program storage area and a data storage area, in which the program storage area may store an operating system and an application program required by at least one function. The data storage area may store data created by the use of an electronic device that implements the text generation method. In addition, the memory 1802 may include a high-speed random access memory, and may also include a non-transitory memory, such as at least one magnetic disk storage device, a flash memory device, or other non-transitory solid-state storage devices. In some embodiments, the memory 1802 may optionally include a memory remotely provided with respect to the processor 1801, and these remote memories may be connected to an electronic device that implements the text generation method through network. Examples of the above networks include, but are not limited to, Internet, intranets, local area networks, mobile communication networks, and combinations thereof.

The electronic device implementing the text generation method may further include: an input apparatus 1803 and an output apparatus 1804. The processor 1801, the memory 1802, the input apparatus 1803, and the output apparatus 1804 may be connected via a bus or other methods. In FIG. 18, the connection via a bus is taken as an example.

The input apparatus 1803 can receive input digital or character information, and generate key signal input related to the user settings and function control of the electronic device that implements the text generation method, such as input devices like a touch screen, a keypad, a mouse, a trackpad, a touchpad, a pointing stick, one or more mouse buttons, a trackball, a joystick and other input apparatus. The output apparatus 1804 may include a display device, an auxiliary lighting apparatus (for example, a light-emitting diode (LED)), a tactile feedback apparatus (for example, a vibration motor), and the like. The display device may include, but is not limited to, a liquid crystal display (LCD), a LED display, and a plasma display. In some embodiments, the display device may be a touch screen.

Various implementations of the systems and technologies described herein can be implemented in a digital electronic circuit system, an integrated circuit system, an specific application-specific integrated circuit (ASIC), computer hardware, firmware, software, and/or combinations thereof.

These various embodiments may be implemented in one or more computer programs, the one or more computer programs may be executed and/or interpreted on a programmable system including at least one programmable processor, the programmable processor may be a dedicated or general purpose programmable processor that can receive data and instructions from the storage system, at least one input apparatus, and at least one output apparatus, and transmit the data and instructions to the storage system, at least one input apparatus, and at least one output apparatus.

These computational procedures (also called programs, software, software applications, or codes) include machine instructions of a programmable processor, and high-level procedures and/or object-oriented programming languages, and/or assembly/machine language may be utilized to implement these computational procedures. As used herein, the terms "machine-readable medium" and "computer-readable medium" refer to any computer program product, device, and/or apparatus used to provide machine instructions and/or data to a programmable processor, for example, magnetic disks, optical disks, memories, programmable logic devices (PLD)), including machine-readable media that receive machine instructions as machine-readable signals. The term "machine-readable signal" refers to any signal used to provide machine instructions and/or data to a programmable processor.

In order to provide interaction with the user, the systems and technologies described herein can be implemented on a computer and the computer includes a display apparatus (for example, a CRT (cathode ray tube) or an LCD (liquid crystal display) monitor)) for displaying information to the user; and a keyboard and a pointing apparatus (for example, a mouse or a trackball) through which the user can provide input to the computer. Other types of apparatus can also be used to provide interaction with the user. For example, the feedback provided to the user can be any form of sensory feedback (for example, visual feedback, auditory feedback, or tactile feedback); and input from the user can be received in any form (including acoustic input, voice input, or tactile input).

The systems and technologies described herein can be implemented in a computing system that includes back-end components (for example, as a data server), or a computing system that includes middleware components (for example, an application server), or a computing system that includes front-end components (for example, a user computer with a graphical user interface or a web browser through which the user can interact with the implementation of the systems and technologies described herein), or a computing system that includes any combination of the back-end components, middleware components, or front-end components. The components of the system can be connected to each other through any form or medium of digital data communication (for example, a communication network). Examples of communication networks include: local area networks (LAN), wide area networks (WAN), and the Internet.

The computer system may include a client and a server. The client and server are generally remote from each other and usually interact through a communication network. The relationship between the client and the server is generated by computer programs that run on the respective computers and have a client-server relationship with each other.

With the technical solution in the embodiments of the present disclosure includes, the corpus data is obtained, the corpus data is labelled to obtain the first constraint element, the first generation target is obtained, the corpus data and the first constraint element are input into a generation model so as to generate the first text matching the first generation target. Therefore, it is possible to provide a text with a relatively strong association and generate texts with different targets, realizing the diversity of text generation, meeting different needs, and improving the quality and efficiency of text generation.

It is understandable that the various forms of processes illustrated above can be used to reorder, add or delete blocks. For example, the blocks described in the present disclosure can be executed in parallel, sequentially, or in a different order, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of this disclosure.

What is claimed is:

1. A text generation method, comprising:
   obtaining corpus data;
   labeling the corpus data to obtain a first constraint element;
   obtaining a first generation target; and
   generating a first text matching the first generation target by inputting the corpus data and the first constraint element into a generation model;
   wherein generating the first text matching the first generation target by inputting the corpus data and the first constraint element into the generation model comprises:
   obtaining a first sub model matching the first generation target from the generation model according to the first generation target; and
   inputting the corpus data and the first constraint element into the first sub model, and generating the first text by the first sub model,
   after generating the first text matching the first generation target, the method further comprises:
   obtaining a second sub model associated with the first sub model, wherein corpus data of the second sub model is the first text;
   labeling the first text to obtain a second constraint element corresponding to the second sub model; and
   generating a second text by inputting the first text and the second constraint element into the second sub model.

2. The text generation method of claim 1, further comprising:
   obtaining a plurality of training corpora and training texts corresponding to the training corpora;
   labeling the training corpora to obtain training constraint elements of the training corpora; and
   generating the generation model by taking the training corpora, the training constraint elements and the training texts as training samples and inputting the training samples into an initial generation model for training.

3. The text generation method of claim 1, wherein inputting the corpus data and the first constraint element into the first sub model and generating the first text by the first sub model comprises:
   obtaining a first material of the first sub model according to the corpus data, and generating the first text according to the first material and the first constraint element.

4. The text generation method of claim 3, wherein the first sub model is an outline generation sub model, and the corpus data is a first corpus text, wherein obtaining the first material of the first sub model according to the corpus data comprises:
   performing type recognition on content of each paragraph in the first corpus text to obtain a type feature of each paragraph;
   obtaining a paragraph collection by classifying the paragraph according to the type feature of the paragraph; and
   determining the paragraph collection and the type feature of the paragraph collection as the first material.

5. The text generation method of claim 3, wherein the first sub model is a text element generation sub model, and the corpus data is a second corpus text, wherein obtaining the first material of the first sub model according to the corpus data comprises:
   obtaining a text theme and a main sentence of the second corpus text, and determining the text theme and the main sentence as the first material.

6. The text generation method of claim 3, wherein the first sub model is a text generation sub model, and the corpus data is a key word, wherein obtaining the first material of the first sub model according to the corpus data comprises:
   generating a search rule according to the keyword, and performing a material search using the key word according to the search rule to obtain the first material.

7. The text generation method of claim 3, wherein the first sub model is a theme generation sub model, and the corpus data is a seed word, wherein obtaining the first material of the first sub model according to the corpus data comprises:
   extracting a first entity from the seed word;
   obtaining a second entity associated with the first entity from a preset knowledge graph according to the first entity; and
   obtaining an association relationship between the first entity and the second entity, and determining the second entity and the association relationship as the first material.

8. The text generation method of claim 3, wherein the first sub model is a text continuation sub model, and the corpus data is a generated text, wherein obtaining the first material of the first sub model according to the corpus data comprises:
   segmenting the generated text to form segmented corpora as the first material.

9. The text generation method of claim 3, wherein the first sub model is a text polishing sub model, and the corpus data is a generated text, wherein obtaining the first material of the first sub model according to the corpus data comprises:
   segmenting content of the generated text to obtain at least one segmentation; and
   identifying part of speech of the at least one segmentation, and selecting a target segmentation from the at least one segmentation as the first material according to the part of speech.

10. The text generation method of claim 3, wherein the first sub model is a text rhetoric sub model, and the corpus data is a generated text, wherein obtaining the first material of the first sub model according to the corpus data comprises:
    extracting a sentence from the generated text, and identifying an entity and a concept from the extracted sentence as the first material.

11. The text generation method of claim 3, wherein the first sub model is a text reuse sub model, and the corpus data is a generated text, wherein obtaining the first material of the first sub model according to t the corpus data comprises:
- extracting paragraphs from the generated text;
- obtaining summary information of the generated text, and obtaining a first paragraph similar to the summary information from the paragraphs according to the summary information; and/or,
- identifying data content of the paragraphs, and selecting a second paragraph from the paragraphs, wherein the amount of the data content in the second paragraph exceeds a preset amount; and
- determining the first paragraph and the second paragraph as the first material.

12. An electrical device, comprising:
- at least one processor, and
- a memory communicatively coupled to the at least one processor; wherein,
- the memory is configured to store instructions executable by the at least one processor, and the instructions are executed by at least one processor to cause at least one processor to execute a text generation method, comprising:
- obtaining corpus data;
- labeling the corpus data to obtain a first constraint element;
- obtaining a first generation target; and
- generating a first text matching the first generation target by inputting the corpus data and the first constraint element into a generation model;
- wherein generating the first text matching the first generation target by inputting the corpus data and the first constraint element into the generation model comprises:
- obtaining a first sub model matching the first generation target from the generation model according to the first generation target; and
- inputting the corpus data and the first constraint element into the first sub model, and generating the first text by the first sub model,
- after generating the first text matching the first generation target, the method further comprises:
- obtaining a second sub model associated with the first sub model, wherein corpus data of the second sub model is the first text;
- labeling the first text to obtain a second constraint element corresponding to the second sub model; and
- generating a second text by inputting the first text and the second constraint element into the second sub model.

13. The electrical device of claim 12, wherein the method further comprises:
- obtaining a plurality of training corpora and training texts corresponding to the training corpora;
- labeling the training corpora to obtain training constraint elements of the training corpora; and
- generating the generation model by taking the training corpora, the training constraint elements and the training texts as training samples and inputting the training samples into an initial generation model for training.

14. The electrical device of claim 12, wherein inputting the corpus data and the first constraint element into the first sub model and generating the first text by the first sub model comprises:
- obtaining a first material of the first sub model according to the corpus data, and generating the first text according to the first material and the first constraint element.

15. The electrical device of claim 14, wherein the first sub model is an outline generation sub model, and the corpus data is a first corpus text, wherein obtaining the first material of the first sub model according to the corpus data comprises:
- performing type recognition on content of each paragraph in the first corpus text to obtain a type feature of each paragraph;
- obtaining a paragraph collection by classifying the paragraph according to the type feature of the paragraph; and
- determining the paragraph collection and the type feature of the paragraph collection as the first material.

16. A non-transitory computer-readable storage medium having computer instructions stored thereon, wherein the computer instructions are configured to make a computer execute a text generation method, comprising:
- obtaining corpus data;
- labeling the corpus data to obtain a first constraint element;
- obtaining a first generation target; and
- generating a first text matching the first generation target by inputting the corpus data and the first constraint element into a generation model;
- wherein generating the first text matching the first generation target by inputting the corpus data and the first constraint element into the generation model comprises:
- obtaining a first sub model matching the first generation target from the generation model according to the first generation target; and
- inputting the corpus data and the first constraint element into the first sub model, and generating the first text by the first sub model,
- after generating the first text matching the first generation target, the method further comprises:
- obtaining a second sub model associated with the first sub model, wherein corpus data of the second sub model is the first text;
- labeling the first text to obtain a second constraint element corresponding to the second sub model; and
- generating a second text by inputting the first text and the second constraint element into the second sub model.

* * * * *